United States Patent Office 2,796,435
Patented June 18, 1957

2,796,435

DERIVATIVES OF 4(DIETHYLAMINOETHOXY)-DIPHENYLPROPANE

Moses Wolf Goldberg, Upper Montclair, and Albert Israel Rachlin, Hackensack, N. J., assignors to Hoffmann-La Roche Inc., Nutley, N. J., a corporation of New Jersey No Drawing. Application February 16, 1955,
Serial No. 488,712

3 Claims. (Cl. 260—570.7)

This invention relates to basic ethers of diphenylalkanes and diphenylalkenes as well as derivatives thereof. More particularly, this invention relates to dialkylaminoalkyl ethers of diphenylalkanes and diphenylalkenes, and hydroxy and acyloxy derivatives thereof.

The compounds of this invention may be represented by the following general formula:

(I)

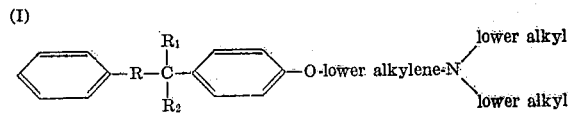

wherein
R represents lower alkylene or lower alkenylene
$R_1$ represents hydrogen, hydroxy or acyloxy, and
$R_2$ represents hydrogen, lower alkyl or phenyl and salts thereof such as acid addition salts and quaternary salts. The terms lower alkylene and lower alkenylene in the above general formula refer, respectively, to lower aliphatic divalent saturated or mono-unsaturated radicals. The lower alkylene and lower alkenylene groups may have a straight chain or a branched chain.

The compounds of this invention are synthesized from p-(dialkylaminoalkoxy)phenyl phenylalkyl ketones, e. g. p-(β-diethylaminoethoxy)phenyl phenethyl ketone, or p-(dialkylaminoalkoxy)phenyl phenylalkenyl ketones, e. g. p-(β-diethylaminoethoxy)phenyl styryl ketone. The saturated ketones are converted to the corresponding tertiary alcohols by treatment with a highly active organo-metallic reagent, such as methyl-, ethyl-, propyl-, butyl-, or phenyl-lithium. Secondary alcohols are obtained by catalytically hydrogenating the saturated or unsaturated ketones. The tertiary alcohols are readily dehydrated to the corresponding olefins by treatment with hot acetic anhydride. The olefins in turn are converted to saturated alkanes by catalytic hydrogenation. The reactions may be applied to p-(dialkylaminoalkoxy)phenyl phenylalkyl ketones which contain an unbranched chain joining the two phenyl groups as well as to those ketones which are substituted on any carbon atom of that portion of the molecule.

In addition, substituents such as lower alkyl may be introduced onto the carbon atom α to the keto group by metalating a saturated ketone with sodium amide and treating the resulting sodium derivative of the ketone with an alkyl halide, for example. Substituents may be introduced onto the carbon atom β to the keto group by treating an unsaturated ketone with a Grignard reagent such as an alkyl- or aryl-magnesium halide, for example, methyl magnesium iodide, ethyl magnesium bromide, phenyl magnesium bromide, etc. The ketones, whether saturated or unsaturated, substituted or unsubstituted on the aliphatic portion of the chain, may be converted to the corresponding alkane or alkene by the Huang-Minlon modification of the Wolff-Kishner reaction [J. Amer. Chem. Soc., 62, 2487 (1946)].

Esters are formed by treating the secondary alcohols, for example, with an acid anhydride, e. g. lower fatty acid anhydrides such as acetic anhydride, propionic anhydride, etc. in the presence of pyridine.

The unsaturated ketones which are starting materials for the compounds of this invention are synthesized by reacting an alkali metal salt of a hydroxyphenyl styryl ketone or of a hydroxyphenyl styryl ketone substituted on the aliphatic portion of the molecule with a dilower alkylaminoalkyl halide as illustrated by the following equation:

(II)

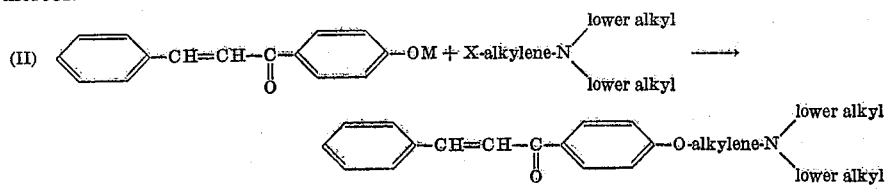

wherein
M represents an alkali metal and
X represents a halogen

The saturated ketones which are starting materials for the present invention are produced by catalytically hydrogenating the corresponding unsaturated ketone produced as described above.

The basic ethers of this invention form acid addition salts with inorganic and organic acids, e. g. hydrochloric, hydrobromic, hydriodic, sulfuric, phosphoric, oxalic, citric, acetic, lactic, tartaric, benzenesulfonic acids and the like. These salts may be formed by reacting the base with the appropriate acid, preferably in a solvent. Since the formation of acid addition salts provides a convenient method of isolating the pure compound in the crystalline form, it is frequently preferable to produce the crude base and then to treat the crude base with an acid such as hydrochloric or citric acid in order to precipitate the crystalline acid addition salt. The free base may then be obtained by neutralizing the acid addition salt with a base such as sodium hydroxide. The crude base may also be purified by distillation.

The free bases also form quaternary ammonium salts with acyclic and cyclic quaternizing agents, such as lower alkyl halides (e. g. methyl bromide, ethyl iodide, n-butyl chloride), di(lower alkyl) sulfates (e. g. dimethylsulfate), aralkyl halides (e. g. benzyl bromide) and the like.

A preferred class constitutes salts formed by the bases with the non-toxic acids and quaternizing agents conventionally employed in the preparation of chemotherapeutic substances.

The bases of Formula I above and their salts are useful as chemotherapeutic agents, e. g. as antifungal agents (for example, in the treatment of infections caused by the organisms *Trichophyton mentagrophytes* and *Microsporon lanosum*) and as antiprotozoan agents (for example, in the treatment of infections caused by *Trichomonas vaginalis*), by application of therapeutic dosages in the conventional vehicles.

Certain of the intermediates used in preparing compounds of this invention are in themselves novel. The novel intermediates are produced as follows (all temperatures are in degrees centigrade):

Example A

A solution of 18 grams (0.056 mol) of p-(β-diethylaminoethoxy)phenyl styryl ketone in ether was added slowly with stirring to the Grignard reagent prepared from 2.5 grams (0.1 mol) of magnesium, 15.6 grams (0.1 mol) of ethyl iodide and 200 cc. of ether. The mixture was stirred and refluxed for 5 hours and was then poured into a cold aqueous solution of ammonium chloride. The ether layer was separated and the aqueous layer was re-extracted with ether. The ether solutions were combined, dried with sodium sulfate and concentrated in vacuo. The base, p-(β-diethylaminoethoxy)phenyl-β-phenyl butyl ketone was obtained as an oil. This base, when treated with 11 grams of citric acid monohydrate in acetone, was converted to the corresponding citrate, M. P. 122–123°.

Example B

A mixture of 100 cc. of dry benzene, 9.35 grams (0.243 mol) of sodium amide (as a suspension in mineral oil) and 68.8 grams (0.211 mol) of p-(β-diethylaminoethoxy)-phenyl phenethyl ketone was stirred and refluxed for 3 hours. The mixture was cooled to 15° and a solution of 30 grams (0.21 mol) of methyl iodide in 100 cc. of benzene was added over a 15 minute period. The temperature of the exothermic reaction was maintained between 35° and 40° by intermittent cooling. After the addition was complete, the reaction was stirred and refluxed for 1 hour. 30 cc. of alcohol were added carefully to the cooled reaction mixture and then it was stirred with 150 cc. of water. The benzene layer was separated, dried over sodium sulfate and finally distilled in vacuo. The product, 1 - [p - (2 - diethylaminoethoxy)phenyl]-2-methyl-3-phenylpropan-1-one, distilled at 182–190° at 0.01 mm.

Example C

A mixture of 120 grams (0.535 mol) of p-hydroxyphenyl styryl ketone, 35 grams (0.65 mol) of sodium methoxide and 1100 cc. of chlorobenzene was stirred and heated to the boiling point. The resulting slurry of the sodium salt of p-hydroxyphenyl styryl ketone was allowed to cool to 40° and 123 grams (0.695 mol) of γ-dipropylaminopropyl chloride were added. The mixture was then stirred and refluxed for 6 hours. After removing the sodium chloride by filtration, the filtrate was evaporated in vacuo to obtain p-(γ-dipropylaminopropoxy)phenyl styryl ketone as an oily base. This base dissolved in 500 cc. of acetone was converted to the oxalate by the addition of a solution of 53 grams of oxalic acid in 200 cc. of acetone. The oxalate thus obtained was recrystallized from ethanol and melted at 144–146°.

Example D

A solution of 94 grams (0.21 mol) of p-(γ-dipropylaminopropoxy)phenyl styryl ketone oxalate in 600 cc. of ethanol and 75 cc. of water was hydrogenated (initial pressure 100 p. s. i.) in the presence of 10 grams of palladium-carbon catalyst (10% palladium) until 0.22 mol of hydrogen had been absorbed. The catalyst was removed by filtration and the filtrate was evaporated in vacuo. The residue was crystallized from 500 cc. of acetone. The p-(γ-dipropylaminopropoxy)phenyl phenethyl ketone oxalate thus obtained was recrystallized from acetone and melted at 114–116°. The free base was obtained by neutralizing the oxalate with dilute aqueous sodium hydroxide.

Example E

A solution of 10.58 grams (0.02 mol) of p-(γ-diethylaminopropoxy)phenyl styryl ketone citrate in aqueous ethanol was stirred with 1.5 grams of palladium-carbon catalyst (10% palladium) and hydrogen at atmospheric pressure until 0.02 mol of hydrogen had been consumed. The catalyst was then filtered off. The mother liquor, upon evaporation in vacuo, left a residue which was crystallized from acetone-water. The p-(γ-diethylaminopropoxy)phenyl phenethyl ketone citrate melted at 136–137°. The free base was obtained by neutralizing the citrate with dilute aqueous sodium hydroxide.

Example F

By the method described in Example C, p-(γ-diethylaminopropoxy)phenyl benzyl ketone, B. P. 207°/0.06 mm., was obtained from 127 grams (0.6 mol) of p-hydroxyphenylbenzyl ketone, 35 grams (0.65 mol) of sodium methoxide, 92.5 grams (0.65 mol) of γ-diethylaminopropyl chloride and 1400 cc. of chlorobenzene.

10 grams of the base thus obtained, dissolved in 30 cc. of acetone, was converted to the citrate by the addition of a solution of 7.2 grams of citric acid monohydrate in 30 cc. of acetone. The p-(γ-diethylaminopropoxy)phenyl benzyl ketone citrate was recrystallized from acetonitrile and melted at 135–136°.

Example G

According to the procedure described in Example A, 15 grams (0.046 mol) of p-(β-diethylaminoethoxy)-phenyl styryl ketone was reacted with the Grignard reagent prepared from 2.5 grams (0.1 mol) of magnesium, 14.2 grams (0.1 mol) of methyl iodide and 200 cc. of ether. The base, p-(β-diethylaminoethoxy)phenyl-β-phenylpropyl ketone, was obtained as an oil. The citrate was formed by treating the base with 10 grams of citric acid monohydrate in 125 cc. of acetone. The citrate was recrystallized from 95% aqueous acetone, M. P. 96–98°.

Example H 9.75 grams (0.02 mol) of p-(β-dimethylaminoethoxy)-phenyl styryl ketone citrate was hydrogenated according to the procedure described in Example E. The p-(β-dimethylaminoethoxy)phenyl phenethyl ketone citrate thus obtained was recrystallized from ethanol and melted at 117–118°.

The following examples are illustrative of the methods of producing the compounds of this invention.

Example 1

A solution of 40.7 grams (0.125 mol) of p-(β-diethylaminoethoxy)phenyl phenethyl ketone in 60 cc. of ether was added to an ethereal solution of methyl-lithium [prepared from 200 cc. of ether, 2.8 grams (0.405 mol) of lithium wire and 28 grams (0.198 mol) of freshly distilled methyl iodide (J. A. C. S., 55, 1252 [1933], Method C)]. The temperature was maintained between −10 and −5° with a carbon dioxide-acetone bath and the time required for the addition was 30 minutes. The resulting slurry was stirred at −5° to 0° for 1 hour longer and then the stirred reaction mixture was treated with 125 cc. of cold water which was added, very carefully at first, from a dropping funnel. While the water was being added, the temperature was kept below 10° by external cooling. The two phase mixture was stirred while it warmed up to room temperature. The two clear phases which developed were then separated. The aqueous layer was extracted with 125 cc. of ether which was combined with the original ether layer. The ether solution was dried over sodium sulfate and evaporated in vacuo to leave the product, 2-[4-(2-diethylaminoethoxy)phenyl]-4-phenyl-2-butanol, as a colorless oil.

The oily base, dissolved in 60 cc. of acetone, was treated with a solution of 32 grams of citric acid monohydrate in 120 cc. of acetone. The product, 2-[4-(2-diethylaminoethoxy)phenyl]-4-phenyl-2-butanol citrate, was recrystallized from methyl ethyl ketone, M. P. 118–119°.

By the same method described above there were obtained the additional compounds listed below. The following list includes, respectively, the starting materials and the amounts used, the base obtained, the salts formed from that base, the melting point for the salt and the solvent of crystallization for the salt:

(a) p-(β-Diethylaminoethoxy)phenyl phenethyl ketone, 34 grams (0.105 mol), and ethyl-lithium gave 3-[4-(2-diethylaminoethyl)phenyl] - 1-phenyl-3-pentanol; 3-[4-(2 - diethylaminoethoxy) phenyl - 1 - phenyl-3-pentanol citrate, M. P. 87–90°, crystallized from methyl ethyl ketone.

(b) p-(β - Diethylaminoethoxy)phenyl phenethyl ketone, 46.7 grams (0.143 mol), and propyl-lithium gave 3-[p-(β-diethylaminoethoxy)phenyl] - 1 - phenyl-3-hexanol; 3 - [p - (β-diethylaminoethoxy)phenyl]-1-phenyl-3-hexanol citrate, M. P. 83–86°, crystallized from methyl ethyl ketone.

(c) p - (β-Diethylaminoethoxy)phenyl phenethyl ketone, 19 grams (0.059 mol), and butyl-lithium gave 3-[4-(2-diethylaminoethoxy)phenyl] - 1 - phenyl-3-heptanol; 3 - [4 - (2 - diethylaminoethoxy)phenyl]-1-phenyl-3-heptanol citrate, M. P. 91–94°, crystallized from methyl ethyl ketone.

(d) p - (β-Diethylaminoethoxy)phenyl phenethyl ketone, 47.8 grams (0.147 mol), and phenyl-lithium gave 1-[4-(2-diethylaminoethoxy)phenyl] - 1,3 - diphenyl - 1-propanol; 1 - [4 - (2-diethylaminoethoxy)phenyl]-1,3-diphenyl-1-propanol citrate, M. P. 85–87°, crystallized from acetone-ether.

(e) p-(β-Diethylaminoethoxy)phenyl β - phenylbutyl ketone, 65.5 grams (0.185 mol), and methyl-lithium gave 2 - [4 - (2 - diethylaminoethoxy)phenyl]-4-phenyl-2-hexanol; 2-[4-(2-diethylaminoethoxy)phenyl] - 4-phenyl-2- hexanol citrate, M. P. 91–93°, crystallized from methyl ethyl ketone, then acetone-ether.

(f) 1-[p-(2-diethylaminoethoxy)phenyl]-2 - methyl-3-phenylpropan-1-one, 25 grams (0.074 mol), and methyl-lithium gave 2 - [p-(β-diethylaminoethoxy)phenyl] - 3-methyl-4-phenyl-2-butanol; 2-[p-(β-diethylaminoethoxy)phenyl]-3-methyl-4-phenyl-2-butanol citrate, M. P. 101–103°, crystallized from acetonitrile-ether.

(g) p-(γ-Dipropylaminopropoxy)phenyl phenethyl ketone, 36.7 grams (0.1 mol), and propyl-lithium gave 3-[p-(γ-dipropylaminopropoxy)phenyl] - 1 - phenyl - 3-hexanol; 3-[p-(γ-dipropylaminopropoxy)phenyl]-1-phenyl-3-hexanol oxalate, M. P. 79–81°, crystallized from acetone.

(h) p-(γ - Diethylaminopropoxy)phenyl phenethyl ketone, 83 grams (0.245 mol), and phenyl-lithium gave 1-[p-(γ-diethylaminopropoxy)phenyl]-1,3-diphenyl - 1-propanol; 1-[p-(γ-diethylaminopropoxy)phenyl]-1,3-diphenyl-1-propanol citrate, M. P. 82–84°, crystallized from acetonitrile-ether.

(i) p-(β-Diethylaminoethoxy)phenyl benzyl ketone, 62 grams (0.2 mol), and methyl-lithium gave 2-[p-(β-diethylaminoethoxy)phenyl]-1-phenyl-2- propanol; 2 - [p-(β-diethylaminoethoxy)phenyl]-1-phenyl-2 - propanol citrate, M. P. 105–107°, crystallized from acetonitrile-ether.

(j) p-(γ - Diethylaminopropoxy)phenyl benzyl ketone, 79.5 grams (0.245 mol), and methyl-lithium gave 2-[p-(γ-diethylaminopropoxy) - phenyl]-1-phenyl-2-propanol; 2-[p-(γ-diethylaminopropoxy)phenyl]-1-phenyl - 2- propanol citrate, M. P. 110–112°, crystallized from acetonitrile-ether.

(k) p-(γ-Diethylaminopropoxy)phenyl benzyl ketone, 79.5 grams (0.245 mol), and phenyl-lithium gave 1-[p-(γ-diethylaminopropoxy)phenyl]-1,2 - diphenylethanol; 1-[p-(γ-diethylaminopropoxy)phenyl]-1,2- diphenylethanol citrate, M. P. 114–116°, crystallized from acetonitrile-ether.

(l) p-(γ-Dipropylaminopropoxy)phenyl phenethyl ketone, 85 grams (0.23 mol), and phenyl-lithium gave 1-[p-(γ-dipropylaminopropoxy)phenyl] - 1,3 - diphenyl-1-propanol.

(m) p-(β-Diethylaminoethoxy)phenyl β- phenylpropyl ketone, 44 grams (0.13 mol), and methyl-lithium gave 2-phenyl-4-[p-(β-diethylaminoethoxy)phenyl]-4-pentanol.

(n) p-(β-Dimethylaminoethoxy)phenyl phenethyl ketone, 58 grams (0.195 mol), and phenyl-lithium gave 1-[p-(β-dimethylaminoethoxy)phenyl]-1,3 - diphenyl - 1-propanol, M. P. 120–122°.

Example 2

A solution of 103 grams (0.302 mol) of 2-[4-(2-diethylaminoethoxy)phenyl]-4-phenyl-2-butanol in 500 cc. of acetic anhydride was refluxed for 18 hours. The acetic anhydride was removed by distillation in vacuo. The residual oil was refluxed for 8 hours with a mixture of 700 cc. of ethanol, 150 cc. of 50% sodium hydroxide and 150 cc. of water. The ethanol was distilled in vacuo and the residue, after the addition of 750 cc. of water, was extracted 3 times with 250 cc. portions of ether. The ether extract was dried with sodium sulfate and evaporated in vacuo to obtain the base, 2-[p-(β-diethylaminoethoxy)-phenyl]-4-phenyl-2-butene, as a residual oil.

The base thus obtained, dissolved in 250 cc. of acetone, was treated with a solution of 70 grams (0.33 mol) of citric acid monohydrate in 250 cc. of acetone. The 2-[p-(β-diethylaminoethoxy)phenyl]-4-phenyl-2-butene citrate was recrystallized from 2600 cc. of methyl ethyl ketone, M. P. 117–119°.

By the same method described in Example 2 above there were obtained the additional compounds listed below. The following list includes, respectively, the starting materials and the amounts used, the base obtained, the salts formed from that base, the melting point for each salt and the solvent of crystallization for the salt:

(a) 3-[4-(2-diethylaminoethoxy)phenyl] - 1 - phenyl-3-pentanol, 38.8 grams (0.11 mol), and acetic anhydride, 250 cc., gave 3 - [p-(β-diethylaminoethoxy)phenyl]-1-phenyl-2-pentene; 3-[p-(β-diethylaminoethoxy)phenyl]-1-phenyl-2-pentene citrate, M. P. 110–112°, crystallized from methyl ethyl ketone.

(b) 3-[p-(β-diethylaminoethoxy)phenyl] - 1 - phenyl-3-hexanol, 37.5 grams (0.102 mol), and acetic anhydride, 250 cc., gave 3 - [p-(β-diethylaminoethoxy)phenyl]-1-phenyl-2-hexene; 3-[p-(β-diethylaminoethoxy)phenyl]-1-phenyl-2-hexene citrate, M. P. 110–112°, crystallized from methyl ethyl ketone.

(c) 3-[4-(2-diethylaminoethoxy)phenyl] - 1 - phenyl-3-heptanol, 42 grams (0.11 mol), and acetic anhydride, 250 cc., gave 3 - [p - (β-diethylaminoethoxy)phenyl]-1-phenyl-2-heptene; 3 - [p-(β-diethylaminoethoxy)phenyl]-1-phenyl-2-heptene citrate, M. P. 112–113°, crystallized from methyl ethyl ketone.

(d) 1 - [4 - (2 - diethylaminoethoxy)phenyl] - 1,3-diphenyl-1-propanol, 40 grams (0.099 mol), and acetic anhydride, 250 cc., gave 1 - [p - (β-diethylaminoethoxy)phenyl] - 1,3 - diphenyl - 1-propene; 1-[p-(β-diethylaminoethoxy)phenyl] - 1,3-diphenyl-1-propene citrate, M. P. 123–125°, crystallized from methyl ethyl ketone.

(e) 2 - phenyl - 4 - [p-(β-diethylaminoethoxy)phenyl]-4-pentanol, 35.5 grams (0.1 mol), and acetic anhydride, 250 cc., gave 2 - phenyl - 4 - [p-(β-diethylaminoethoxy)-phenyl]-3-pentene; 2-phenyl-4-[p-(β-diethylaminoethoxy)-phenyl]-3-pentene citrate, M. P. 106–108°, crystallized from acetonitrile.

(f) 2 - [4 - (2 - diethylaminoethoxy)phenyl]-4-phenyl-2-hexanol, 44 grams (0.12 mol), and acetic anhydride, 250 cc., gave 2 - [p-(β-diethylaminoethoxy)phenyl]-4-phenyl-2-hexene; 2-[p-(β-diethylaminoethoxy)phenyl]-4-phenyl-2-hexene citrate, M. P. 114–116°, crystallized from acetonitrile.

(g) 2 - [p - (β - diethylaminoethoxy)phenyl]-3-methyl-4-phenyl-2-butanol, 22.7 grams (0.065 mol), and acetic anhydride, 200 cc., gave 2-[p-(β-diethylaminoethoxy)-phenyl] - 3-methyl-4-phenyl-2-butene; 2-[p-(β-diethylaminoethoxy)phenyl] - 3 - methyl - 4-phenyl-2-butene citrate, M. P. 130–132°, crystallized from acetonitrile.

(h) 1 - [p - (γ - diethylaminoproproxy)phenyl] - 1,3-diphenyl-1- propanol, 99 grams (0.237 mol), and acetic anhydride, 500 cc., gave 1-[p-(γ-diethylaminopropoxy)- phenyl] - 1,3 - diphenyl-1-propene; 1-[p-(γ-diethylaminopropoxy)phenyl]-1,3-diphenyl-1-propene citrate, M. P. 93–95°, crystallized from acetonitrile.

(i) 1 - [p - (γ-dipropylaminopropoxy)phenyl]-1,3-diphenyl-1-propanol, 88 grams (0.198 mol), and acetic anhydride, 500 cc., gave 1-[p-(γ-dipropylaminopropoxy)phenyl] - 1,3 - diphenyl - 1 - propene; 1-[p-(γ-dipropylamino propoxy)phenyl]-1,3-diphenyl-1-propene oxalate, M. P. 166–168°, crystallized from ethanol.

(j) 1 - [p - (β - dimethylaminoethoxy)phenyl] - 1,3-diphenyl-1-propanol, 43 grams (0.114 mol), and acetic anhydride, 350 cc., gave 1-[p-(β-dimethylaminoethoxy)phenyl] - 1,3 - diphenyl - 1 - propene; 1-[p-(β-dimethylaminoethoxy)phenyl] - 1,3 - diphenyl-1-propene citrate, M. P. 81–85°, crystallized from acetonitrile.

(k) 2 - [p - (β-diethylaminoethoxy)phenyl]-1-phenyl-2-propanol, 47.4 grams (0.145 mol), and acetic anhydride, 500 cc., gave 2-[p-(β-diethylaminoethoxy)phenyl]-1-phenyl - 1-propene; 2-[p-(β-diethylaminoethoxy)phenyl]-1-phenyl-1-propene citrate, M. P. 117–120°, crystallized from acetonitrile.

(l) 2 - [p - (γ-diethylaminopropoxy)phenyl]-1-phenyl 2-propanol, 63 grams (0.184 mol), and acetic anhydride, 460 cc., gave 2 - [p - (γ-diethylaminopropoxy)phenyl]-1-phenyl-1-propene; 2-[p-(γ-diethylaminopropoxy)phenyl]-1-phenyl-1-propene citrate, M. P. 140–142°, crystallized from acetonitrile.

(m) 1 - [p - (γ - diethylaminopropoxy)phenyl]-1,2-diphenyl ethanol, 90 grams (0.22 mol), and acetic anhydride, 460 cc., gave 1-[p-(γ-diethylaminopropoxy)phenyl]-1,2-diphenyl ethylene; 1-[p-(γ-diethylaminopropoxy)phenyl]-1,2-diphenyl ethylene citrate, M. P. 150–152°, crystallized from acetonitrile.

*Example 3*

A mixture of 62 grams (0.182 mol) of p-(β-diethylaminoethoxy)phenyl-β-phenylpropyl ketone, 39 grams of potassium hydroxide flakes, 32 cc. of 85% hydrazine hydrate and 1000 cc. of triethylene glycol was heated in a flask equipped with a 6-inch Vigreaux column. The temperature of the reaction mixture was raised to 200° within a 90 minute period, water being removed from the top of the column during this time. The temperature was then held at 200–205° for 6 hours. The reaction mixture was cooled to about 40° and poured into 2 liters of water. The oil which precipitated was extracted 3 times with 350 cc. of ether and the extract was dried with sodium sulfate. After removing the solvent in vacuo, there was obtained 1-[p-(β-diethylaminoethoxy)phenyl]-3-phenylbutane as a residual oil.

The oil thus obtained was dissolved in 200 cc. of acetone and treated with a solution of 38 grams (0.18 mol) of citric acid monohydrate in 200 cc. of acetone. The 1-[p-(β-diethylaminoethoxy)phenyl]-3-phenylbutane citrate was recrystallized from a mixture of 800 cc. of acetone, 25 cc. of water and sufficient ether to produce a slightly turbid solution. The citrate, recrystallized from a mixture of acetone and ether, melted at 102–103°.

By the same method described in Example 3 above there were obtained the additional compounds listed below. The following list includes, respectively, the starting materials and the amounts used, the base obtained, the salts formed from that base, the melting point for each salt and the solvent of crystallization for the salt:

(a) p - (β-diethylaminoethoxy)phenyl β-phenyl butyl ketone, 43 grams (0.122 mol), 85% hydrazine hydrate, 20 cc., potassium hydroxide flakes, 24 grams, and triethylene glycol, 500 cc., gave 1-[4-(2-diethylaminoethoxy)-phenyl]-3-phenyl pentane; 1-[4-(2-diethylaminoethoxy)phenyl]-3-phenylpentane citrate, M. P. 111–113°, crystallized from acetone.

(b) 1 - [p - (2 - diethylaminoethoxy)phenyl]-2-methyl-3-phenylpropan-1-one, 43 grams (0.127 mol), 85% hydrazine hydrate, 21 cc., potassium hydroxide flakes, 24 grams, and triethylene glycol, 500 cc., gave 1-[p-(2-diethylaminoethoxy)phenyl]-2-methyl-3-phenylpropane; 1-[p-(2 - diethylaminoethoxy)phenyl] - 2 - methyl-3-phenylpropane citrate, M. P. 109–111°, crystallized from acetonitrile.

(c) p-(β-dimethylaminoethoxy)phenyl phenethyl ketone, 17.9 grams (0.058 mol), 85% hydrazine hydrate, 10 cc., potassium hydroxide flakes, 12 grams, and triethylene glycol, 250 cc., gave 1-phenyl-3-[p-(β-dimethylaminoethoxy) phenyl]propane; 1-phenyl-3-[p-(β-dimethylaminoethoxy)phenyl]propane citrate, M. P. 111–113°, crystallized from acetonitrile.

(d) p-(γ-diethylaminopropoxy)phenyl phenethyl ketone, 19 grams (0.056 mol), 85% hydrazine hydrate, 9.8 cc., potassium hydroxide flakes, 11.9 grams, and triethylene glycol, 250 cc., gave 1-phenyl-3-[p-(γ-diethylaminopropoxy)phenyl]propane; 1-phenyl-3-[p-(γ-diethylaminopropoxy)phenyl]propane citrate, M. P. 104–106°, crystallized from acetonitrile.

(e) p-(β-diethylaminoethoxy)phenyl benzyl ketone, 10 grams (0.032 mol), 85% hydrazine hydrate, 7.0 cc., potassium hydroxide flakes, 6.5 grams, and triethylene glycol, 200 cc., gave 1-phenyl-2-[p-(β-diethylaminoethoxy)phenyl]ethane; 1 - phenyl - 2-[p-(β-diethylaminoethoxy)phenyl]ethane citrate, M. P. 113–114°, crystallized from acetone.

(f) p - (β-diethylaminoethoxy)phenyl styryl ketone, 58.5 grams (0.18 mol), 85% hydrazine hydrate, 28 cc., potassium hydroxide flakes, 32 grams, and triethylene glycol, 300 cc., gave 3-[p-(β-diethylaminoethoxy)phenyl]-1-phenyl-1-propene; 3-[p-(β-diethylaminoethoxy)phenyl]-1-phenyl-1-propene citrate, M. P. 96–97°, crystallized from ethanol; 3-[p-(β-diethylaminoethoxy)phenyl]-1-phenyl-1-propene ethiodide, M. P. 102–104°, crystallized from acetone-ether.

(g) p-(β-Diethylaminoethoxy)phenyl phenethyl ketone, 14.8 grams (0.045 mol), 85% hydrazine hydrate, 7.0 cc., potassium hydroxide flakes, 8.5 grams, and triethylene glycol, 100 cc., gave 1-phenyl-3-[p-(β-diethylaminoethoxy)phenyl]propane; 1-phenyl-3-[p-(β-diethylaminoethoxy)phenyl]propane citrate, M. P. 105–107°, crystallized from ethanol; 1-phenyl-3-[p-(β-diethylaminoethoxy)phenyl]propane ethiodide, M. P. 89–91°, crystallized from acetone-ether.

*Example 4*

A solution of 25.75 grams (0.05 mol) of 2-[p-(β-diethylaminoethoxy)phenyl]-4-phenyl-2-butene citrate in a mixture of 280 cc. of methanol and 20 cc. of water was shaken in a rocking autoclave at room temperature with 2.5 grams of palladium-carbon catalyst (10% palladium) and hydrogen (initial pressure 60 p. s. i.). The theoretical amount of hydrogen (0.05 mol) was absorbed in about 10 minutes. After removing the catalyst by filtration; the filtrate was evaporated in vacuo. 3-[p-(β-diethylaminoethoxy)phenyl]-1-phenylbutane citrate was obtained as a white crystalline mass. Upon recrystallization from ethanol, the citrate melted at 122–124°.

The 3-[p-(β-diethylaminoethoxy)phenyl]-1-phenylbutane citrate was partitioned between ether and dilute aqueous sodium hydroxide. The ether layer was separated, dried over sodium sulfate and evaporated in vacuo leaving the base, 3-[p-(β-diethylaminoethoxy)phenyl]-1-phenylbutane, as a colorless oil.

A solution of 18 grams of 3-[p-(β-diethylaminoethoxy)-phenyl]-1-phenylbutane and 17.2 grams of ethyl iodide in 200 cc. of acetone was refluxed for 44 hours. The solvent was distilled off in vacuo. The residue was triturated with ether until the crude product solidified. It was separated by filtration and recrystallized from acetone-ether. The 3-[p-(β-diethylaminoethoxy)phenyl]-1-phenylbutane ethiodide melted at 109–111°.

By the same method described in Example 4 above, there were obtained the additional compounds listed below. The following list includes, respectively, the starting materials and the amounts used, the salts obtained, the melting point for each salt and the solvent of crystallization for the salt. Neutralization of the acid salt with dilute aqueous sodium hydroxide, as described above, produces the free base.

(a) 1 - phenyl - 3 - [p - (β - diethylaminoethoxy)-phenyl] - 2 - pentene citrate, 40.5 grams (0.077 mol); 1-phenyl - 3 - [p-(β - diethylaminoethoxy)phenyl]pentane citrate, M. P. 111.5–113°, crystallized from methyl ethyl ketone.

(b) 1 - phenyl - 3 - [p-(β - diethylaminoethoxy)-phenyl] - 2 - hexene citrate, 23.5 grams (0.043 mol); 1-phenyl - 3 - [p - (β - diethylaminoethoxy)phenyl]hexane citrate, M. P. 113–115°, crystallized from methyl ethyl ketone.

(c) 1 - phenyl - 3 - [p - (β - diethylaminoethoxy)-phenyl] - 2 - heptene citrate, 25 grams (0.045 mol); 1-phenyl - 3 - [p - (β - diethylaminoethoxy)phenyl]heptane citrate, M. P. 110–112°, crystallized from methyl ethyl ketone.

(d) 1,3 - diphenyl - 1 - [p - (β - diethylaminoethoxy)-phenyl] - 1 - propene citrate, 24 grams (0.042 mol); 1,3-diphenyl - 3 - [p - (β - diethylaminoethoxy)phenyl]-propane citrate, M. P. 107–109°, crystallized from methyl ethyl ketone.

(e) 4 - phenyl - 2 - [p - (β - diethylaminoethoxy)-phenyl] - 2 - hexene citrate, 27 grams (0.05 mol); 4-phenyl - 2 - [p - (β - diethylaminoethoxy)phenyl]hexane citrate, M. P. 115–117°, crystallized from acetonitrile.

(f) 2 - [p - (β - diethylaminoethoxy)phenyl] - 3 - methyl - 4 - phenyl - 2 - butene citrate, 26.2 grams (0.05 mol); 2 - [p - (β - diethylaminoethoxy)phenyl] - 3 - methyl - 4 - phenylbutane citrate, M. P. 122–124°, crystallized from acetonitrile.

(g) 1 - [p - (β - dimethylaminoethoxy)phenyl] - 1,3-diphenyl - 1 - propene citrate, 25 grams (0.046 mol); 1 - [p - (β - dimethylaminoethoxy)phenyl] - 1,3 - diphenylpropane citrate, M. P. 75–77°, crystallized from acetone-ether.

(h) 1-[p - (γ - diethylaminopropoxy)phenyl] - 1,3 - diphenyl - 1 - propene citrate, 53 grams (0.09 mol); 1-[p - (γ - diethylaminopropoxy)phenyl] - 1, 3 - diphenylpropane citrate, M. P. 101–103°, crystallized from acetonitrile.

(i) 1 - phenyl - 2 - [p - (β - diethylaminoethoxy)-phenyl] - 1 - propene citrate, 25 grams (0.05 mol); 1-phenyl - 2 - [p - (β - diethylaminoethoxy)phenyl]propane citrate, M. P. 121–123°, crystallized from acetonitrile.

(j) 2 - [p - (γ - diethylaminopropoxy)phenyl] - 1 - phenyl - 1 - propene citrate, 47.5 grams (0.092 mol); 2-[p - (γ - diethylaminopropoxy)phenyl] - 1 - phenylpropane citrate, M. P. 110–113°, crystallized from acetonitrile-ether.

(k) 1 - [p- (γ - diethylaminopropoxy)phenyl] - 1,2-diphenylethylene citrate, 29.3 grams (0.051 mol); 1-[p - (γ - diethylaminopropoxy)phenyl] - 1,2 - diphenylethane citrate, M. P. 138–140°, crystallized from acetonitrile-ether.

*Example 5*

A solution of 8.3 grams (0.02 mol) of p-(β-diethylaminoethoxy)phenyl styryl ketone oxalate in 150 cc. of ethanol and 50 cc. of water was stirred with 4.5 grams of palladium-carbon catalyst (10% palladium) and hydrogen at atmospheric pressure until 0.04 mol of hydrogen had been absorbed. The catalyst was removed by filtration and the filtrate was evaporated in vacuo. The residue was partitioned between 50 cc. of water, 15 cc. of 4 N NaOH and 50 cc. of ether. The ether solution was separated, dried over sodium sulfate and evaporated in vacuo. 1 - [p - (β - diethylaminoethoxy)phenyl] - 3 - phenylpropanol was thus obtained as a viscous oil.

The base obtained above was converted to the citrate by treatment with citric acid monohydrate in acetone. Recrystallized from acetone, the citrate melted at 77–78°.

*Example 6*

A mixture of 20 grams (0.061 mol) of 1 - [p - (β-diethylaminoethoxy)phenyl] - 3 - phenylpropanol, 50 cc. of dry pyridine and 20 cc. of acetic anhydride was heated on a stream bath for 3 hours. The pyridine and excess acetic anhydride were distilled in vacuo and the residual oil was partitioned between 250 cc. of cold water and 250 cc. of ether. The ether layer was dried over sodium sulfate and evaporated in vacuo. 1 - [4 - (2 - diethylaminoethoxy)phenyl] - 3 - phenyl - 1 - acetoxypropane was obtained as an oil.

The oily base obtained above was dissolved in 50 cc. of acetone and treated with a solution of 17.5 grams of citric acid monohydrate in 75 cc. of acetone. The 1-[4 - (2 - diethylaminoethoxy)phenyl] - 3 - phenyl - 1-acetoxypropane citrate melted at 104–105°.

By the method described above, 1 - [4 - (2 - diethylaminoethoxy)phenyl] - 3 - phenyl - 1 - propionoxypropane was prepared from 23 grams (0.07 mol) of 1 - [p - (β-diethylaminoethoxy)phenyl] - 3 - phenylpropanol, 25 cc. of propionic anhydride and 25 cc. of pyridine.

The oily base obtained above was converted in a similar manner to 1 - [4 - (2 - diethylaminoethoxy)phenyl] - 3-phenyl - 1 - propionoxypropane citrate, M. P. 102–103°.

We claim:

1. A member of the group consisting of 1 - [p - (β-diethylaminoethoxy)phenyl] - 3 - phenylbutane and 3-[p - (β - diethylaminoethoxy)phenyl] - 1 - phenylbutane.

2. 1 - [p - (β - diethylaminoethoxy)phenyl] - 3 - phenyl butane.

3. 3 - [p - (β - diethylaminoethoxy)phenyl] - 1 - phenyl butane.

References Cited in the file of this patent

UNITED STATES PATENTS

| | | |
|---|---|---|
| 2,668,850 | Goldberg et al. | Feb. 9, 1954 |
| 2,703,324 | Blinkley et al. | Mar. 1, 1955 |

OTHER REFERENCES

Cavallini et al.: "Il Farmaco: Scienza E. Tecnica," vol. 5, pp. 501–504 (1950).